(12) United States Patent
Diehl (10) Patent No.: US 11,739,780 B2
(45) Date of Patent: Aug. 29, 2023

(54) FUNCTIONAL ELEMENT (71) Applicant: PROFIL Verbindungstechnik GmbH & Co. KG, Friedrichsdorf (DE)

(72) Inventor: Oliver Diehl, Usingen (DE)

(73) Assignee: PROFIL Verbindungstechnik GmbH & Co. KG, Friedrichsdorf (DE)

( * ) Notice: Subject to any disclaimer, the term of this patent is extended or adjusted under 35 U.S.C. 154(b) by 0 days.

(21) Appl. No.: 17/691,762

(22) Filed: Mar. 10, 2022

(65) Prior Publication Data

US 2022/0290711 A1 Sep. 15, 2022

(30) Foreign Application Priority Data

Mar. 12, 2021 (DE) .......................... 102021106103.2

(51) Int. Cl.
*F16B 19/08* (2006.01)
*B21J 15/02* (2006.01)

(52) U.S. Cl.
CPC ........... *F16B 19/086* (2013.01); *B21J 15/025* (2013.01); *F16B 19/08* (2013.01)

(58) Field of Classification Search
CPC .. F16B 5/04; F16B 19/00; F16B 19/04; F16B 19/086; F16B 21/00; F16B 21/086; F16B 37/14; F16B 19/08; B21J 15/025
USPC ................... 411/372.5, 372.6, 373, 500, 501
See application file for complete search history.

(56) References Cited

U.S. PATENT DOCUMENTS

| | | | |
|---|---|---|---|
| 3,343,442 A | 9/1967 | Knowlton | |
| 4,046,054 A | 9/1977 | Gulistan | |
| 5,439,336 A * | 8/1995 | Muller | F16B 35/06 411/181 |
| 5,528,812 A * | 6/1996 | Muller | F16B 37/062 29/520 |
| 6,186,717 B1 | 2/2001 | Cosenza | |
| 7,179,034 B2 * | 2/2007 | Ladouceur | B23P 19/062 411/181 |
| 8,734,071 B2 * | 5/2014 | Babej | B21K 1/46 411/180 |
| 2005/0265804 A1 * | 12/2005 | Muller | F16B 5/04 411/378 |
| 2013/0022782 A1 * | 1/2013 | Babej | F16B 37/068 428/131 |
| 2013/0136558 A1 | 5/2013 | Schneider | |

(Continued)

FOREIGN PATENT DOCUMENTS

| | | |
|---|---|---|
| DE | 2348754 A1 | 7/1976 |
| DE | 102004020362 A1 | 3/2004 |
| DE | 10241326 A1 | 11/2005 |

(Continued)

*Primary Examiner* — Roberta S Delisle
(74) *Attorney, Agent, or Firm* — Gregory J. Gore, Esq.

(57) ABSTRACT

The invention relates to a functional element, in particular to a bolt element, for attachment to a workpiece, in particular a sheet metal part. The functional element comprises a fastening section that has a reshaping section that can be reshaped to fasten the functional element to the workpiece, in particular wherein the reshaping section is a rivet section, and a functional section having a functional region, wherein the functional section is connected, in particular is rotationally fixedly connected, to the fastening section. The fastening section and the functional section are produced from different materials.

25 Claims, 9 Drawing Sheets

(56) References Cited

U.S. PATENT DOCUMENTS

2013/0224426 A1\* 8/2013 Ellis ................... F16B 19/086
411/501

FOREIGN PATENT DOCUMENTS

| DE | 202007012797 U1 | 12/2007 |
|----|---|---|
| DE | 102012003819 A1 | 8/2013 |
| EP | 3133303 A1 | 2/2017 |

\* cited by examiner

FUNCTIONAL ELEMENT

The invention relates to a functional element, in particular to a bolt element, for attachment to a workpiece, such as a sheet metal part.

Such functional elements or bolt elements are generally known and can serve to fasten further objects to the workpiece by means of a functional region of the functional element. In many cases, the attachment of the functional element to the workpiece takes place by means of a rivet section that can be reshaped. If the workpiece and the rivet section fastened thereto have different materials, there is a risk of galvanic corrosion in metallic components. In addition, mechanical stresses can arise during a thermal expansion of the workpiece and/or of the functional element and can lead to damage or destruction of the workpiece and/or of the functional element. However, it may be necessary for the functional region of the functional element to have properties, for example a certain material hardness, that cannot be achieved by the material of the workpiece. In such a case, there has to be a deviation from the optimal design, at least with respect to the functional region or with respect to the rivet section, in the case of known functional elements.

The invention is based on the object of providing a functional element that enables a reliable fastening of the functional element to a workpiece and, at the same time, an optimal design of the functional region.

The object is satisfied by a functional element having the features of claim 1.

The functional element in accordance with the invention, in particular a bolt element, for attachment to a workpiece, in particular a sheet metal part, comprises a fastening section that has a reshaping section that can be reshaped to fasten the functional element to the workpiece, in particular wherein the reshaping section is a rivet section, and a functional section having a functional region, wherein the functional section is connected, in particular is rotationally fixedly connected, to the fastening section. The fastening section and the functional section are produced from different materials.

The invention is based on the general idea of producing the fastening section of the functional element and the functional section of the functional element from different materials so that each section can be optimally adapted to the respective requirements to be met. The fastening section can be produced from a material that enables a stable and reliable fastening of the functional element to the workpiece and in so doing avoids galvanic corrosion, mechanical stresses due to thermal expansion, and further problems. The reshaping section and/or the total fastening section can in particular be produced from the same or a similar material as the workpiece. The material of the functional section can be selected such that it optimally satisfies its intended function. For example, the material of the functional section can have a great hardness to be able to attach a stable thread thereto.

The functional region of the functional section can serve to fasten further objects or components to the functional element. For this purpose, the functional region can have one or more functional components, such as an internal or external thread, plug-in components, snap-in components or clamping components, hooks, and/or a bore.

The functional element can be a bolt element whose functional section is configured as a bolt section that comprises a shaft part. The functional region of the bolt section can be arranged at the shaft part. The functional region can be configured as a smooth bolt and/or can in particular comprise an external thread, wherein an internal thread and further functional components can alternatively or additionally be provided at the bolt. The functional element can further be a nut element whose functional section is configured as a nut section, in particular whose functional region has an axial passage opening and an internal thread.

The functional section and the fastening section can be connected to one another in a rotationally fixed manner, i.e. such that they are not rotatable relative to one another. Provision can be made that the functional section and the fastening section are connected to one another such that they are rotatable relative to one another.

The fastening section and/or the functional section can define a longitudinal axis of the functional element. The fastening section and the functional section can be arranged consecutively and/or coaxially along the longitudinal axis. The fastening section and the functional section can at least regionally mutually overlap along the longitudinal axis.

The fastening section and/or the functional section can be rotationally symmetrical, wherein a rotational symmetry can exist with respect to a rotation by any desired angle or with respect to a rotation by one specific angle or a plurality of specific angles. At least the reshaping section can in particular be rotationally symmetrical and can, for example, have a cylindrical or a sleeve-shaped base shape having a round base surface.

The fastening section can have features providing security against rotation that enable a rotationally fixed attachment to the workpiece, i.e. that prevent a rotation of the fastening section relative to the workpiece. Said features providing security against rotation can comprise elevated portions or depressions, for example, grooves or ribs. The features providing security against rotation can be arranged at the reshaping section and/or at another region of the fastening section, for example, at a radial outer side, at a surface of the fastening section facing the workpiece, and/or at a surface of the fastening section to be brought into contact with the workpiece. The features providing security against rotation can be arranged distributed, in particular uniformly distributed, in a peripheral direction. The fastening section and/or the reshaping section can have a polygonal base surface or a base surface that otherwise deviates from a round shape in order to enable a rotationally fixed connection between the fastening section and the workpiece.

Advantageous embodiments of the invention can be seen from the dependent claims, from the description, and from the drawing.

In accordance with an embodiment, the fastening section is self-punching so that it can be punched into a workpiece without a prefabricated hole. The fastening section can have a punching edge that can be arranged at the reshaping section and in particular at an axial end section of the reshaping section, in particular at the end section facing away from the functional section. Alternatively, the reshaping section can be provided to be inserted into a hole prefabricated in the workpiece.

In accordance with a further embodiment, the fastening section and the functional section are each produced from a metallic material, for example, from an aluminum material or a steel material. The fastening section and/or the functional section can be electrically conductive and can in particular at least regionally have bare metal surfaces that are provided for establishing an electrical contact. Alternatively, the fastening section and/or the functional section can be produced from a plastic material or a fiber composite material. Depending on the application, numerous material combinations are possible for the functional section and the fastening section, for example, plastic and metal, metal and metal, plastic and plastic.

The fastening section can have a head part adjoining the reshaping section in an axial direction, in particular wherein the head part has a head part support surface extending in a radial direction and facing the reshaping section. The head part, in particular the head part support surface, can be provided to be in contact with the workpiece in an assembly state of the functional element. The head part and/or the head part support surface can be of annular design. For a rotationally fixed connection between the fastening section and the workpiece, one or more features providing security against rotation, as described above, can be formed at the head part and/or at the head part support surface.

The head part can further comprise a head part contact surface that can extend in a radial direction and that can in particular be arranged at an end section of the head part facing away from the reshaping section. The head part contact surface can serve as an engagement surface for a setting device for inserting the functional element into a workpiece.

In accordance with a further embodiment, the functional section has a first coupling section for establishing a rotationally fixed coupling with a second coupling section, wherein the second coupling section is formed at the fastening section. The first and the second coupling section can be arranged at radial inner or outer sides of the functional section and of the fastening section that are arranged in an adjacent manner in the functional element. The first and the second coupling section can also be arranged at adjacent surfaces of the functional section and the fastening section and/or at surfaces of the functional section and the fastening section that are in contact with one another, said surfaces having a component of extent perpendicular to the longitudinal axis of the functional element and/or extending perpendicular to the longitudinal axis.

In accordance with an embodiment, the first and the second coupling section have corresponding coupling features that are in engagement with one another so that a form fit effective in a peripheral direction is provided. For example, the corresponding coupling features are elevated portions engaging into one another, on the one hand, and depressions, on the other hand, in particular, for instance, knurlings, tooth profiles, or wedge profiles. The corresponding coupling features can comprise positive and negative shape features, for example, polygonal shapes, star or flower shapes, pins, etc. that rotationally fixedly engage into one another.

Alternatively or additionally, the first and the second coupling section can be connected to one another in a bonded and/or force-fitted manner, for example, by means of soldering, adhesive bonding, welding, or similar methods. The first and the second coupling section can be pressed with one another in a force-fitted manner. Any desired combination of form fit, force fit, and/or bonding is possible.

The first and the second coupling section can generally be configured as corresponding threads. A rotationally fixed coupling can be achieved in the screw-in direction by an axial abutment. In the unscrewing direction, a rotationally fixed coupling can additionally be ensured by blocking an unscrewing movement in the axial direction, for example, by means of a further axial abutment. Such an abutment can be achieved by a suitable displacement of material, in particular by cutting off or deforming material of the functional section and/or of the fastening section, for example, in the course of the fastening of the functional section to the fastening section.

Alternatively or additionally, the functional section can have a third coupling section for establishing a coupling effective at least in an axial direction with a fourth coupling section that is formed at the fastening section. An axial relative movement of the functional section and the fastening section along the longitudinal axis of the functional element can generally take place in two axial directions. The third and the fourth coupling section usually cooperate such that a relative movement of the functional section and the fastening section is limited or completely prevented in an axial direction. In addition, the third and the fourth coupling section can be configured such that they are effective in both axial directions.

In an embodiment, the third and the fourth coupling section can have corresponding coupling features that are in engagement with one another so that a form fit effective at least in an axial direction is provided. For example, the corresponding coupling features of the third and fourth coupling section can be surfaces that are in contact with one another and that each have at least one component of extent perpendicular to the longitudinal axis of the functional element. For example, the third and fourth coupling section can comprise conically formed surfaces. Alternatively or additionally, the third and fourth coupling section can be connected to one another in a bonded and/or force-fitted manner.

To block a relative movement in at least the second axial direction, an additional axial abutment or undercut can be provided. Said additional axial abutment or undercut can, for example, be produced by a suitable material displacement, in particular by scraping off or deforming material of the functional section and/or of the fastening section, for example, in the course of the fastening of the functional section to the fastening section.

The first and third coupling section of the functional section and/or the second and fourth coupling section of the fastening section can at least sectionally coincide, i.e. a form-fit feature, a force-fit feature, and/or a bonding feature can cause a coupling of the functional section and the fastening section in both the radial and the axial direction.

In accordance with an embodiment, the reshaping section bounds at least an axial section of a hollow space of the fastening section in the peripheral direction, wherein the hollow space is open at a side facing away from the head part. The hollow space of the fastening section can extend in the axial direction beyond the reshaping section, in particular in the direction of the head part. In a reshaping process, for example a riveting process, the reshaping section can be riveted around from its inner side, for example by means of a die, and can be expanded in the radial direction to engage behind the workpiece so that a form-fitted connection secure against being pulled out can be produced with the workpiece.

In accordance with a further embodiment, the head part has an axial passage opening that is in communication with the hollow space, in particular wherein the passage opening and the hollow space are coaxially arranged. For example, the fastening section can have a continuous axial opening that comprises the passage opening and the hollow space.

In accordance with an embodiment, at least one portion of the functional section projects into or through the passage opening. The functional region of the functional section can in particular project from the head part, advantageously at the side facing away from the reshaping section, so that a component can be fastened to the functional region of the functional element at the side of the workpiece facing away from the reshaping section, for example.

Alternatively or additionally, the functional section can have a sleeve-shaped design. The sleeve can so-to-say line the passage opening and/or the hollow space and can, for example, have an internal thread. If a harder material, e.g. steel, is selected for the functional section and a softer material, e.g. aluminum, is selected for the fastening section, a functional element having a comparatively easily deformable fastening section and a stable, harder internal thread can be provided, for example.

In accordance with a further embodiment, the passage opening and/or the hollow space has/have an abutment and/or a radial shoulder. Alternatively or additionally, the passage opening has a smaller inner diameter than the hollow space so that an abutment or a radial shoulder is formed. The shoulder can be step-shaped or conical, for example. Alternatively or additionally, the passage opening and/or the hollow space can have a first and a second section having different inner diameters, wherein the section having the larger inner diameter can face the reshaping section and the section having the smaller inner diameter can face the head part.

The functional section can have a radially expanded end section that cooperates with the abutment or the shoulder. The radially expanded end section of the functional section can, for example, be produced by reshaping or riveting techniques. For example, the functional section can be introduced into the hollow space and/or the passage opening of the fastening section, typically with an end facing away from the radially expanded end section at the front and in particular from the side of the reshaping section. The radially expanded end section of the functional section can be dimensioned exactly such that it enters into engagement with the abutment or the shoulder and is in this way coupled in an axial direction to the fastening section. The radially expanded end section of the functional section, in particular a surface extending in the radial direction or a surface of the radially expanded end section having at least one radial component of extent, can be associated with the third coupling section, while the abutment or the shoulder can be associated with the fourth coupling section.

The first coupling section can be arranged at an end region, in particular at a radially expanded end region, of the functional section. The first and the third coupling section can further also be arranged at a shaft part of the functional section. The second and the fourth coupling section can be arranged in the passage bore, at the shoulder, or at an inner wall of the hollow space or the second and the fourth coupling section can be formed by the shoulders or regions of the inner wall of the hollow space or of the passage bore.

In accordance with a further embodiment, a section of the inner wall of the hollow space and/or a section of the passage opening is/are reshaped to produce a radially inwardly projecting undercut, in particular by a scraping-off process. For example, the undercut can be produced during the insertion and fastening of the functional section to the fastening section. A form-fitted connection can in particular first be established between the functional section and the fastening section and leads to a scraping off or deformation of material of the functional section and/or fastening section due to a further application of force and a relative movement of the functional section and the fastening section with respect to one another. Alternatively, the undercut can be produced after the insertion of the functional section into the fastening section to secure both in a specific relative position. The undercut produced can be part of the first, second, third, and/or fourth coupling section.

A further aspect of the invention relates to a functional unit that comprises a functional element as described above and a fixing element. The fixing element is fixable, in particular releasably fixable, to the functional region of the functional element, in particular wherein the fixing element has a fixing element contact surface that faces the head part of the fastening section in a state of the fixing element mounted at the functional element.

For example, the functional unit can be used to clamp a further object between the fixing element, in particular the fixing element contact surface, and the head part, in particular a head part contact surface. To secure the further object to the functional unit in a manner secure against rotation, the fixing element contact surface and/or the head part contact surface can have corresponding features providing security against rotation, for example, ribs or grooves.

The fixing element can be screwed to the functional element. The fixing element contact surface can be arranged in an end region of the fixing element facing the head part or the workpiece. The fixing element can have an axial passage opening. For example, the fixing element can be a nut element that can be screwed onto a functional section whose functional region in particular has an external thread. The fixing element can be a screw or a bolt and can in particular be screwed into a functional section comprising an internal thread. The fixing element contact surface can comprise a lower side of a screw head facing the head part. The fixing element can comprise a latching apparatus, a plug-in apparatus, or a clamping apparatus, a hook, a cotter pin, or similar suitable apparatus.

A functional unit comprising a functional section, configured as a bolt section, and a fixing nut can serve to provide a ground connection by which an electrical contact can be established between a cable lug and a workpiece into which the functional unit is inserted in that the cable lug is clamped between the fixing nut and a head part of the fastening section. To provide bare metal surfaces in the region of the head part contact surface, the fixing element contact surface and/or the bolt section, the functional unit can advantageously be painted in a fully assembled state, i.e. with the fixing nut screwed on. If the fixing element is subsequently unscrewed from the bolt element, the unpainted bare metal surfaces of the bolt section, of the fixing element contact surface, and of the head part contact surface are exposed and can be contacted by the cable lug.

In accordance with an embodiment, the fixing element has an engagement section for a tool for fastening the fixing element to the functional region, in particular a shape feature, and/or a setting section, in particular a substantially annular setting surface, wherein the setting section is suitable for engaging at a setting device in order to fasten the functional unit to the workpiece. The engagement section can, for example, be a drive profile, such as a square shape feature or a hexagonal shape feature, a recess, or a cross recess, that is, for example, arranged at an end section of the fixing element facing away from the fixing element contact surface. The setting section can, for example, be arranged at a flange section of the fixing element and can in particular be facing away from the fixing element contact surface.

A further aspect of the present invention relates to a component assembly comprising a functional element or a functional unit as described above and a workpiece, in particular a sheet metal part, wherein the fastening section of the functional element is attached in a form-fitted manner to the workpiece in a fastening region of the workpiece by a reshaping process, in particular by a riveting process. The longitudinal axis of the functional element can be arranged perpendicular to a workpiece surface.

The workpiece can be formed from a metallic material or from a plastic and it can in particular comprise a fiber composite material.

In accordance with an embodiment, the reshaping section of the fastening section, in particular the total fastening section, and the fastening region of the workpiece, in particular the total workpiece, are produced from the same material. A reliable connection between the fastening section and the workpiece is thus established without galvanic corrosion being able to occur between the workpiece and the fastening section or the introduction of a mechanical stress due to a different temperature expansion of the fastening section and the workpiece having to be expected. The functional section can be produced from a material that enables an optimal satisfaction of the intended function. The material can, for example, be softer or harder than that of the fastening section.

A further aspect of the present invention relates to a method of manufacturing a component assembly as described above. The method comprises the steps: (i) providing a functional element or a functional unit as described above; (ii) inserting the fastening section into a prefabricated hole in the workpiece or inserting the fastening section into the workpiece in a self-punching manner; and (iii) reshaping the reshaping section to produce an undercut engaging behind the workpiece in order to fasten the functional element or the functional unit to the workpiece. The advantages that were described above in connection with the functional element and the functional unit can so-to-say be achieved by this method.

In accordance with an embodiment, a setting device is provided in the method that cooperates with the fastening section, in particular with a head part of the fastening section, or with the fixing element, in particular with a setting section, in order to press the functional element or the functional unit against the workpiece. Known apparatus, which have a punch and a suitable die, can generally serve as the setting device in this respect.

The invention will be described in the following purely by way of example with reference to different embodiments and to the drawings. There are shown.

Figure 1A:
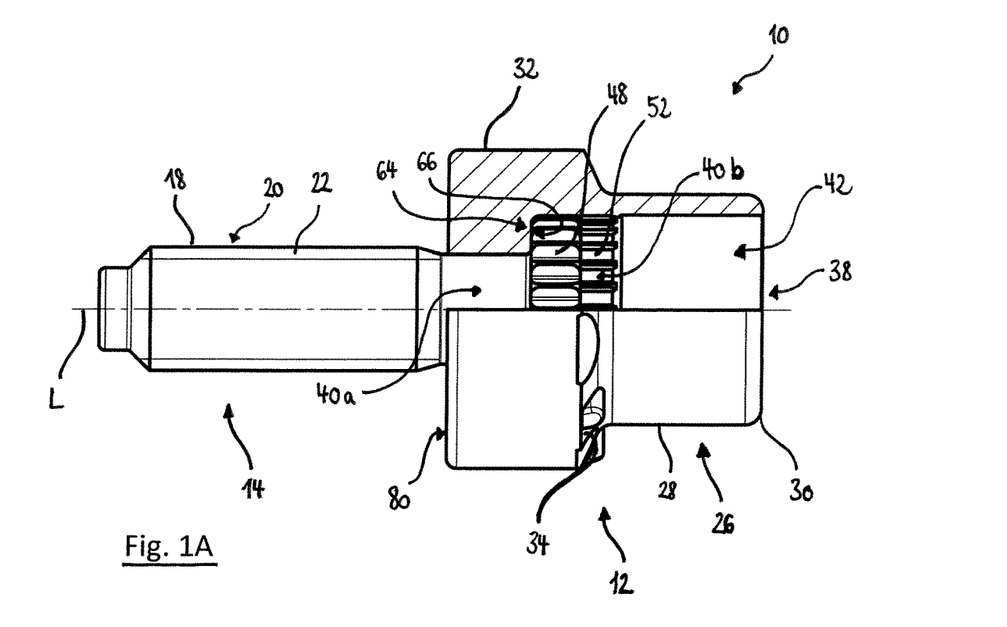
FIG. 1A a side and cross-sectional view of a functional element in accordance with a first embodiment.
Figure 1B:
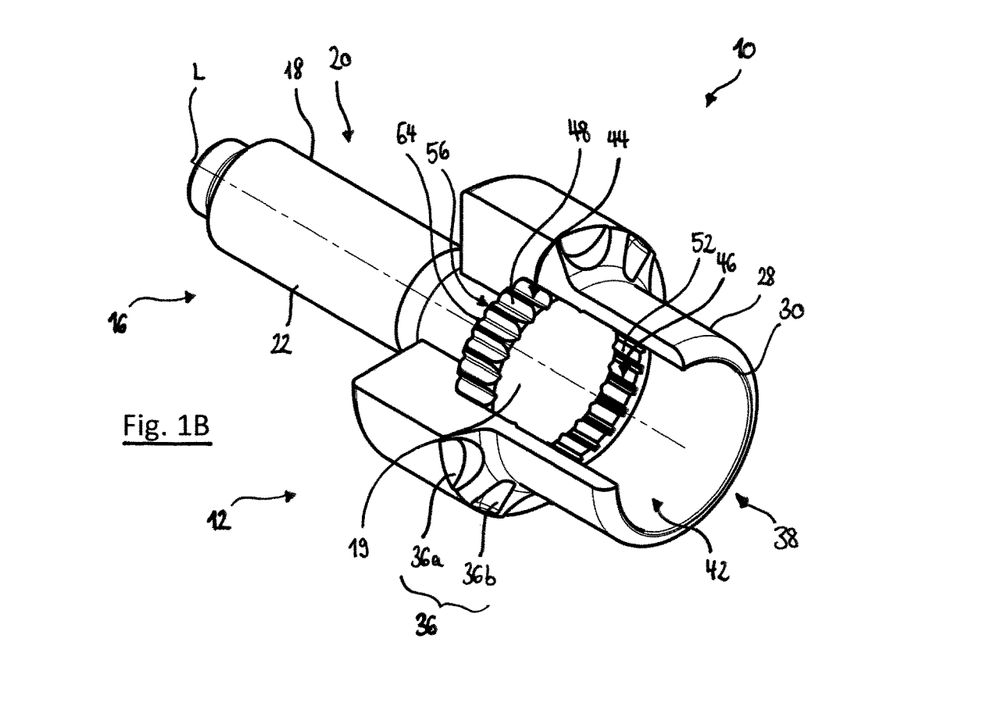
FIG. 1B a perspective view of the functional element of FIG. 1A.
Figure 1C:
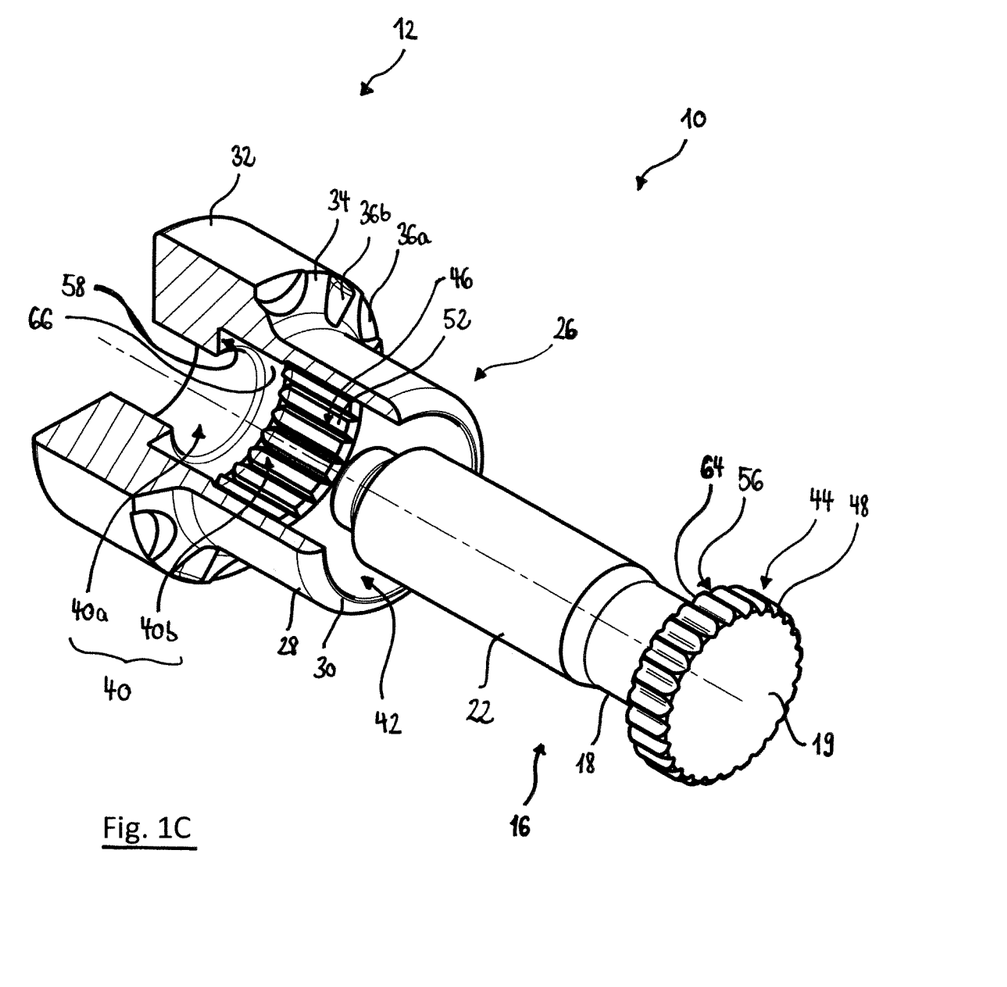
FIG. 1C an exploded drawing of the functional element of FIG. 1A.

FIGS. 1A-1C show a functional element 10 comprising a fastening section 12 and a functional section 14. The fastening section 12 and the functional section 14 are arranged coaxially and along a common longitudinal axis L and are rotationally fixedly connected to one another (FIGS. 1A, 1B). The fastening section 12 serves for the fastening of the functional element 10 to a workpiece 24 (cf. FIG. 4), while the functional section 14 in the embodiment shown is provided to fasten further objects to the functional element 10 (not shown).

The fastening section 12 and the functional section 14 are produced from different materials, for example, from different metallic materials. The material of the fastening section 12 is designed for an optimal fastening to the workpiece 24. For this purpose, the fastening section 12 can, for example, be produced from the same material as the workpiece 24, for example, from aluminum. The functional section 14 is produced from a material that is designed for the optimal attachment of further objects and that, for example, enables the insertion of a stable thread. Specifically, the functional section 14 can be produced from a steel material.

The fastening section 12 is sleeve-shaped (FIG. 1C). It comprises a reshaping section 26 that is configured as a rivet section 28 that can be reshaped. The rivet section 28 is self-punching and, at its end facing away from the shaft part 18, comprises a punching edge 30 for producing an opening in the workpiece 24 for inserting the fastening section 12.

In the axial direction, a head part 32 adjoins the reshaping section 26 at the side facing away from the punching edge 30. At the side facing the reshaping section 26, the head part 32 has a head part support surface 34 that extends in the radial direction and that comes into contact with the workpiece 24 in an assembly state in which the functional element 10 is attached to the workpiece 24.

Figure 2A:
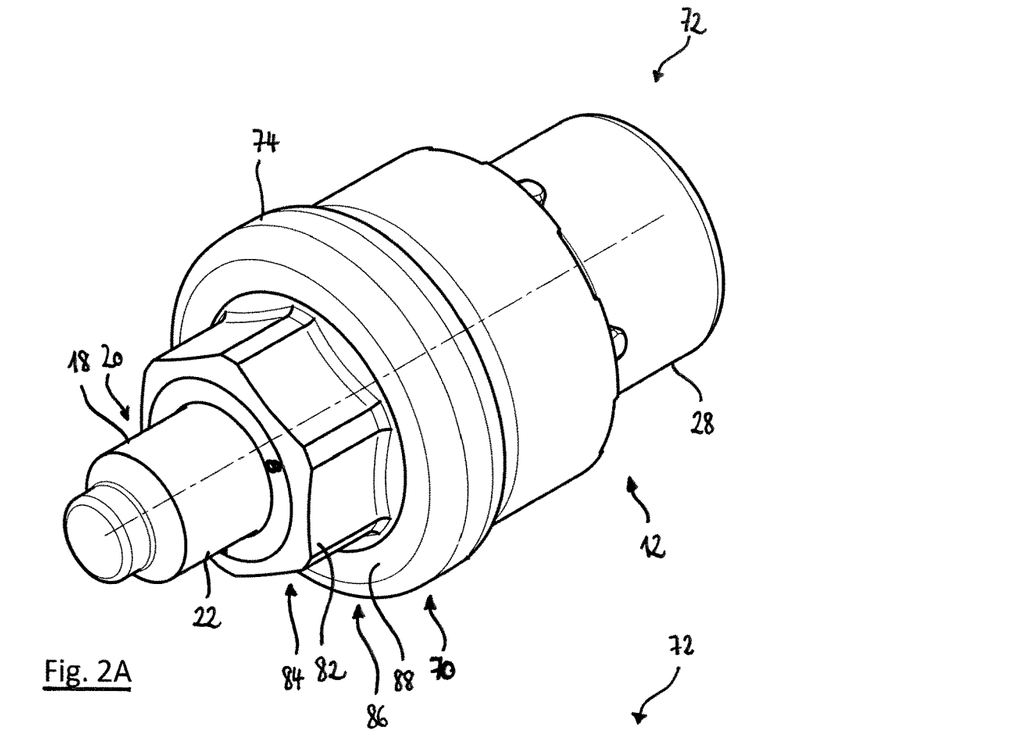
FIG. 2A a perspective view of a functional unit comprising the functional element of FIG. 1A and a fixing element, viewed from the side of the fixing element.
Figure 2B:
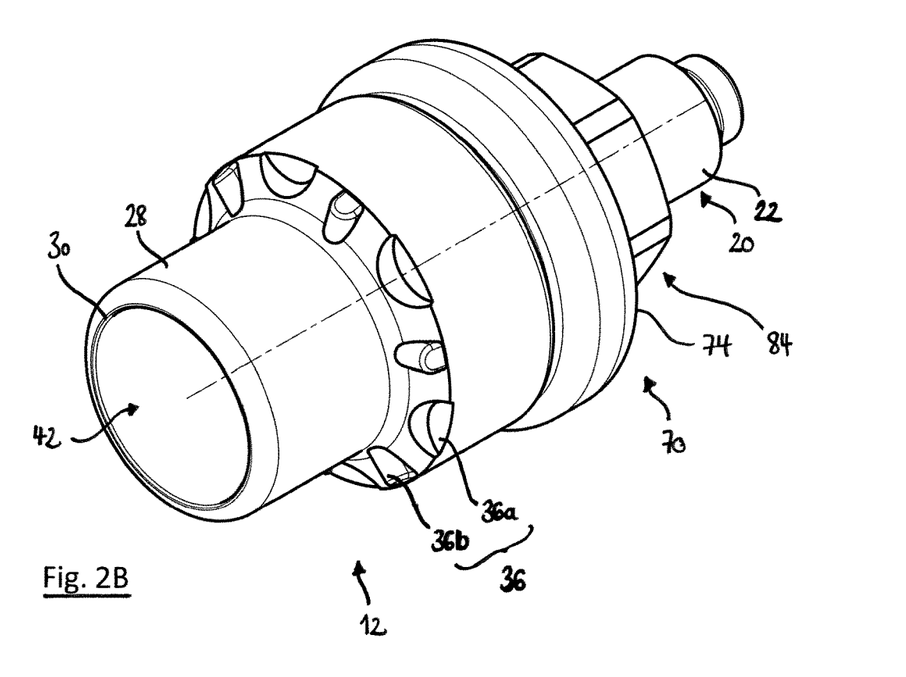
FIG. 2B a perspective view of the functional unit of FIG. 2A, viewed from the side of the fastening section.
Figure 2C:
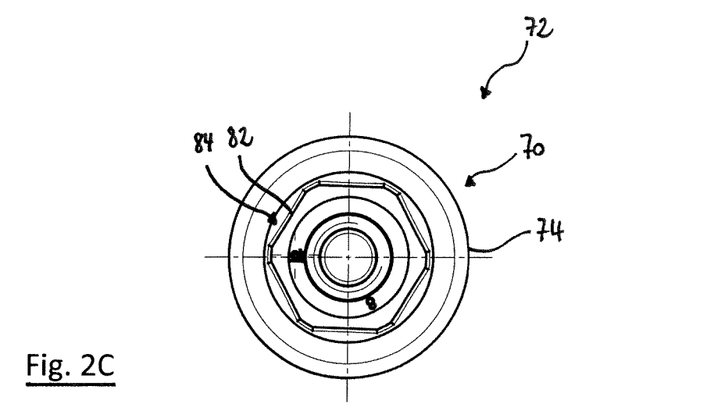
FIG. 2C a front view of the functional unit of FIG. 2A, viewed from the side of the fixing element.
Figure 2D:
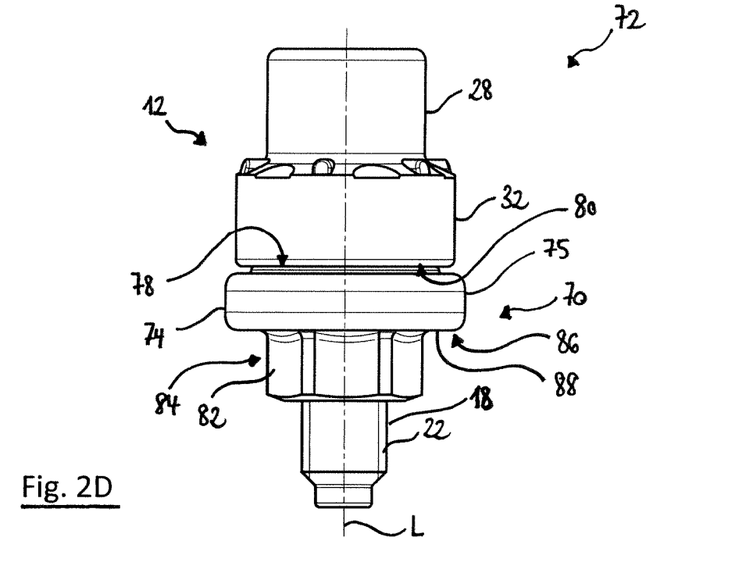
FIG. 2D a side view of the functional unit of FIG. 2A.
Figure 2E:
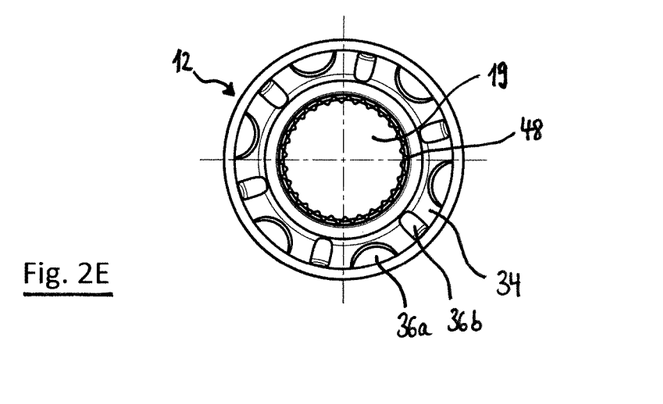
FIG. 2E a front view of the functional unit of FIG. 2A, viewed from the side of the fastening section.

To provide a fastening secure against rotation of the fastening section 12 to the workpiece 24, the head part support surface 34 has a plurality of features providing security against rotation 36 that are arranged at regular intervals in the peripheral direction (cf. also FIG. 2E). The features providing security against rotation 36 comprise, in an alternating arrangement, recesses 36a into which material of the workpiece 24 can flow and elevated portions 36b that can dig into the material of the workpiece 24. Alternatively or additionally, features providing security against rotation 36 can be arranged at the reshaping section 26 or at a radial outer side of the head part 32 (not shown).

The fastening section 12 has a continuous axial opening 38 (FIG. 1C) that has a plurality of sections adjoining one another in the axial direction. The axial opening 38 comprises a passage opening 40 arranged in the head part 32 and a hollow space 42 that is bounded by the reshaping section 26 in the peripheral direction. The hollow space 42 is open at the side facing away from the head part 32, i.e. at the side of the punching edge 30, and communicates with the passage opening 40, which is arranged coaxially to the hollow space 42, at the side of the head part 32. The passage opening 40 has a first section 40*a* having a smaller inner diameter at the side facing away from the reshaping section 26 and a second section 40*b* having a larger inner diameter at the side facing the reshaping section 26. A shoulder 66, which extends in the radial direction, is located at the transition between the first section 40*a* and the second section 40*b*. The second section 40*b* has a smaller inner diameter than the hollow space 42.

In the embodiment shown, the functional section 14 is configured as a bolt section 16 having a shaft part 18, with the shaft part 18 comprising a functional region 20 having an external thread 22. Further objects can be fixedly screwed to the bolt section 16 by means of the external thread 22.

For a fastening to the fastening section 12, the functional section 14 has a radially expanded end section 19 at its end facing away from the shaft part 18. The radially expanded end section 19 of the functional section 14 is received in the axial opening 38 of the fastening section 12, while a portion of the functional section 14, specifically a large part of the shaft part 18, projects through the passage opening 40 and out of the passage opening 40 at the side facing away from the reshaping section 26 (FIGS. 1B, 1C). The functional region 20 is thereby accessible for the fastening of further objects.

As shown in FIG. 1C, the external thread 22 can already be attached to the shaft part 18 before the bolt section 16 is fastened to the fastening section 12. Furthermore, provision can, however, be made to connect a bolt section 16 having an initially smooth shaft part 18 to the fastening section 12 and only subsequently to apply the external thread 22 through a cutting or rolling process. In this case, as shown in FIGS. 1A-1C, the external thread 22 ends in the axial direction at the latest where the shaft part 18 enters the fastening section 12.

A rotationally fixed coupling takes place between a first coupling section 44 arranged at the functional section 14 and a second coupling section 46 arranged at the fastening section 12, said coupling sections 44 and 46 being in engagement with one another. In accordance with the first embodiment, the first coupling section 44 is arranged at the radial outer side at the radially expanded end section 19 of the functional section 14 and comprises a first toothed arrangement or a knurling 48 that runs around in the peripheral direction and that serves as a first coupling feature.

The second coupling section 46 is arranged at the radial inner side in the fastening element 12, specifically in the passage opening 40 of the head part 32, and comprises a second coupling feature that is formed as a second toothed arrangement or knurling 52 complementary to the first coupling feature. In the assembled functional element 10, the toothed arrangements 48 and 52 are in engagement with one another so that a form fit effective in the peripheral direction prevents a rotation of the fastening section 12 and the functional section 14 relative to one another.

To couple the functional section 14 to the fastening section 12 in an axial direction, a third coupling section 56 is provided at the functional section 14 and a fourth coupling section 58 is provided at the fastening section 12, said coupling sections having mutually corresponding coupling features. The third coupling section 56 is arranged at a radially extending surface 64 of the radially expanded end section 19 that faces the shaft part 18. The fourth coupling section 58 is arranged in the passage opening 40 of the head part 32 and comprises the radial shoulder 66 (FIG. 1C).

The radial shoulder 66 is in engagement with the radially extending surface 64 (FIG. 1A) and brings about a form fit between the fastening section 12 and the functional section 14, said form fit acting in the axial direction and preventing the functional section 14 from passing completely through the passage opening 40 at the side of the head part 32.

To additionally effect a coupling in the opposite axial direction, the third and/or fourth coupling section 56 and 58 can comprise further coupling features. For example, on the insertion of the functional section 14 into the axial opening 38, material can be scraped off from the inner wall of the hollow space 42 and/or of the passage opening 40 or can otherwise be reshaped and urged behind a side of the radial end section 19 facing the reshaping section 26 so that the material produces a radially inwardly projecting undercut 68 (cf. FIG. 6B).

Alternatively or additionally, the inner diameter of the second toothed arrangement 52 of the second coupling section 46 can be slightly smaller than the outer diameter of the first toothed arrangement 48 of the first coupling section 44. Due to the pressing of the functional section 14 into the fastening section 12, a force-fitted fastening can take place so that the pressed toothed arrangements 48 and 52 not only provide a security against rotation in the radial direction, but also an axial pull-out security of the functional section 14 acting in two directions. Thus, the first toothed arrangement 48 can simultaneously act as a coupling feature of the first and third fastening section 44 and 56 and the second toothed arrangement 52 can simultaneously act as a coupling feature of the second and fourth coupling section 46 and 58.

Figure 3:
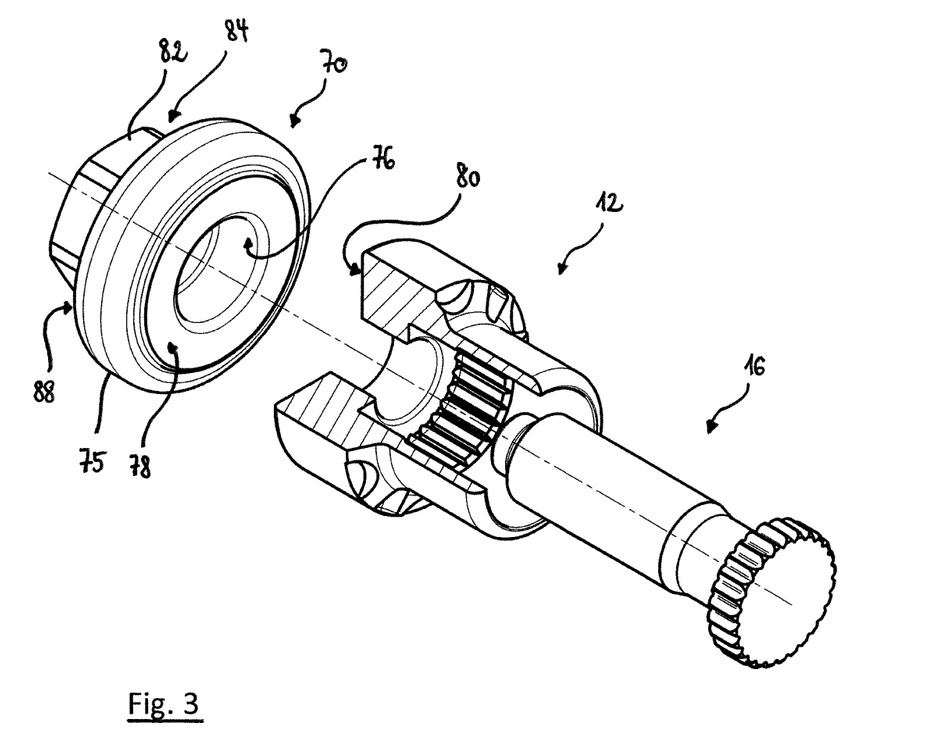
FIG. 3 an exploded drawing of the functional unit of FIG. 2A.

FIGS. 2A and 2B show perspective views of a functional unit 72 that, in addition to the functional element 10 in accordance with FIGS. 1A-1C, comprises a coaxially arranged fixing element 70 that is configured as a fixing nut 74. The fixing nut 74 has an internal thread 76 (see FIG. 3) and is releasably screwed to the external thread 22 of the bolt section 16.

The fixing nut 74 has a flange section 75 comprising a fixing element contact surface 78 (FIG. 3) that, in a state fastened to the functional element 10, faces the head part 32 and in particular a radially extending head part contact surface 80. A further object, in particular an annular object, can be clamped between the fixing nut 74 and the fastening section 12, and in particular between the head part contact surface 80 and the fixing element contact surface 78, and, after the removal of the fixing nut 74, said further object can be guided over the shaft part 18 and can be fixedly clamped by a further screwing tight of the fixing nut 74 without the object itself having to be turned. The object can, for example, be a cable lug. Objects having different axial extents can be fixed on the external thread 22 by a variable tightening of the fixing nut 74.

For a screwing tight and a loosening, the fixing nut 74 has an engagement section 84 for a tool, in the present case a substantially hexagonal drive profile 82 that can be actuated by means of a corresponding screwing tool (FIG. 2C). The engagement section 84 is arranged at an end section of the fixing nut 74 facing away from the fixing element contact surface. The flange section 75 has, at its side facing away from the fixing element contact surface 78, a setting section 86 that comprises an annular setting surface 88 that extends around the drive profile 82. A setting device for fastening the functional unit 72 to the workpiece 24 can engage at the setting surface 88 in order to produce a component assembly 90 in accordance with FIG. 4.

Figure 4:
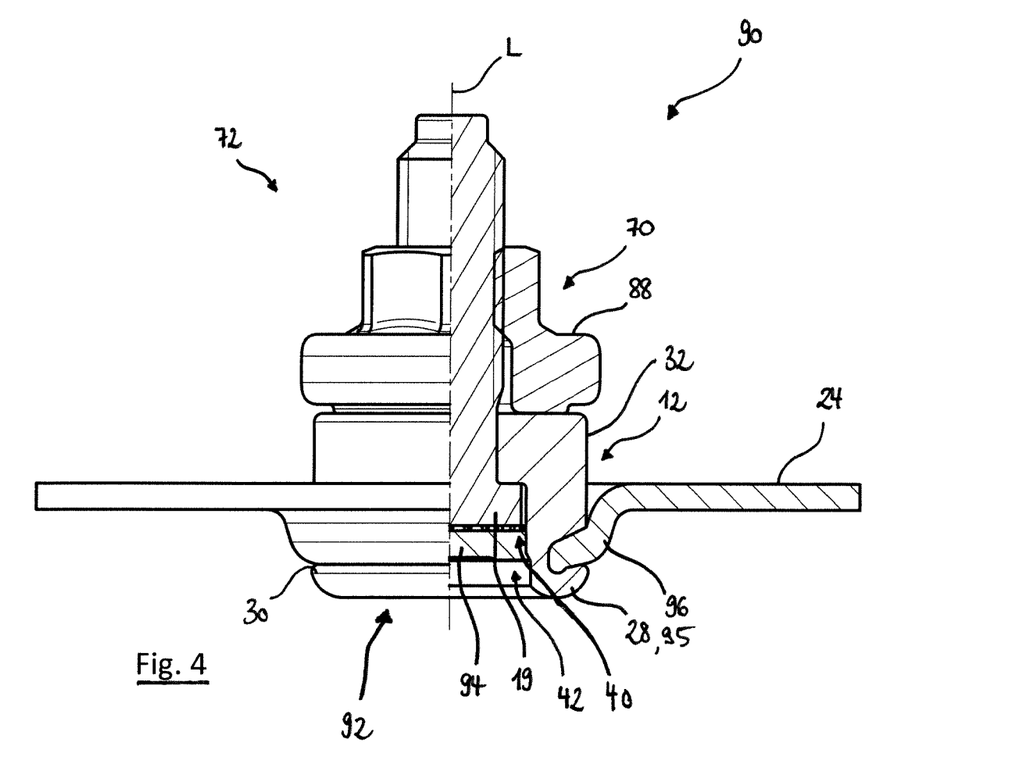
FIG. 4 a component assembly comprising the functional unit of FIG. 2A and a workpiece.

To manufacture the component assembly 90, the fastening section 12 of the functional unit 70 is inserted into the workpiece 24, wherein a hole 92 for receiving the rivet section 28 is produced in a self-punching manner in the workpiece by the punching edge 30. The material of the self-punching fastening section 12 can correspond to that of the workpiece 24 or can be slightly harder, for example. The required punch-in force can be applied by a setting device (not shown) that acts on the setting surface 88 along the longitudinal axis L to press the functional unit 72 against the workpiece 24. In order to apply a counter-force, a suitable die (not shown) can be provided at the side of the workpiece 24 facing away from the functional unit 72 to be punched in.

On the punching of the fastening section 12 into the workpiece 24, a punched slug 94 is produced. In the embodiment shown, the punched slug 94 is at least sectionally pressed through the hollow space 42 of the reshaping section 26 into a section of the passage opening 40 that has a slightly smaller inner diameter than the hollow space 42. In this way, the punched slug 94 is secured in the fastening section 12 in a form-fitted and/or force-fitted manner.

To make the securing of the punched slug 94 in the fastening section 12 particularly reliable, material of the knurling 52 of the second coupling section 46 can be brought into engagement with the punched slug 94, in particular by means of a die. For this purpose, the punched slug 94 can be pressed with the knurling 52. Alternatively or additionally, the knurling 52 can be deformed, for example scraped off, in a region facing the rivet section 28, in particular by a die, and can be brought into engagement with the punched slug 94 such that the latter is particularly reliably secured in the fastening section 12. The form-fitted connection between the fastening section 12 and the punched slug 94 can be strengthened in this manner.

The rivet section 28 whose shape can be changed can be reshaped in the course of the punching-in process, in particular by the same setting device, in particular comprising a suitable die, in a riveting process, in particular in the radial direction, in order to produce an undercut 95, which engages behind the workpiece 24 and specifically the margin of the hole 92, in order to fasten the functional unit 72 to the workpiece in a form-fitted manner. In this respect, a dome-like or bead-like deformation 96 of the workpiece 24 in the axial direction and a dipping of the head part 32 into the dome-like deformation 96 can be provided as in FIG. 4.

Due to the force of the setting device applied in the course of the punching-in and/or reshaping process, material of the workpiece 24 can flow into the recesses 36a and/or can be displaced by the elevated portions 36b such that a connection secure against rotation between the workpiece 24 and the fastening section 12 is produced. In combination with the rotationally fixed connection of the fastening section 12 and the functional section 14, a rotationally fixed functional region 20 for fastening a further object results at the workpiece 24.

If a functional element 10 in accordance with FIGS. 1A-1C is to be inserted into the workpiece 24 instead of the functional unit 72, the setting device can thus engage at the head part 32 of the functional element 10, in particular at the head part contact surface 80 extending in the radial direction. The further setting process can take place as described.

The workpiece 24 can in particular be a sheet metal part, for example, a body part composed of metal. The reshaping section 26 or the total fastening section 12 can be produced from the same material as the workpiece 24 to ensure a fastening that is stable and that is insensitive to galvanic corrosion and thermal expansion. The functional section 14 can likewise be produced from metal, for example, from another metallic material or another alloy of the material of the fastening section 12. Depending on the application, the functional section 14 can also be produced from a plastic or fiber composite material.

Figure 5A:
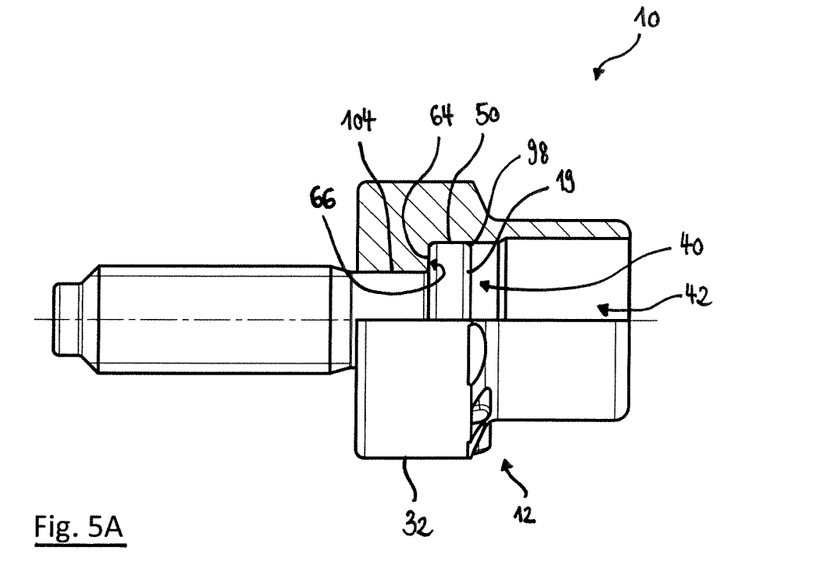
FIG. 5A a side and cross-sectional view of a functional element in accordance with a second embodiment.
Figure 5B:
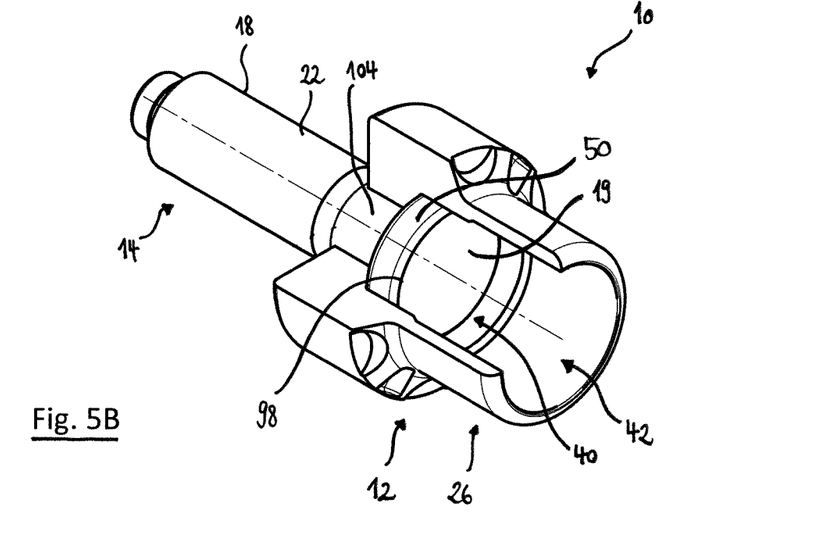
FIG. 5B a perspective view of the functional element of FIG. 5A.

FIGS. 5A, 5B show a functional element 10 in accordance with a second embodiment. The functional element 10 corresponds in essential components to the functional element 10 in accordance with the first embodiment. In deviation therefrom, a bonded connection is provided between the fastening section 12 and the functional section 14 in accordance with FIGS. 5A, 5B. The first coupling region 44 and the second coupling region 46 therefore do not have a knurling or a toothed arrangement, but are rather, like the third and fourth coupling region 56 and 58, formed by smooth surfaces. In the case of a bonded connection, the distinction between those coupling regions that prevent a radial rotation and those coupling regions that prevent an axial displacement is superfluous insofar as a bond at any desired point can prevent every relative movement of the fastening section 12 and the functional section 14. Thus, the first and third coupling regions 44 and 56 at the bolt section 16 and the second and fourth coupling sections 56 and 58 at the fastening section 12 can coincide.

The bonded connection can be selectively produced by adhesive bonding, soldering, welding or similar methods, in particular depending on the materials of the fastening section 12 and of the functional section 14. The connection can take place areally, along connection lines, and/or point-wise. A full-area adhesive bonding can be particularly stable that extends at a radial outer side 50 of the radially expanded end section 19 and along the radially extending surface 64 of the radially expanded end section 19 and, in correspondence therewith, at the radial inner side in the passage opening 40 of the head part 32 and at the radially extending shoulder 66 of the passage opening 40. Furthermore, the first section 40a of the passage opening 40 and the corresponding section of the shaft part 104 can also be adhesively bonded to one another. If the functional section 14 and the fastening section 12 are composed of different metallic materials, a full-area adhesive bonding can contribute as a protective layer towards preventing galvanic corrosion.

If a weld connection or solder connection is provided, it can in particular take place along points or lines that bound the aforementioned surfaces and that are accessible to a welding or soldering tool. For example, such a connection can take place along the contact line 98 of the radially outer margin, facing away from the shaft part 18, of the radially expanded end section 19 with the inner wall of the passage opening 40.

Instead of a bond or in addition thereto, a force fit can also be provided between the functional section 14 and the fastening section 12 to couple the components to one another in an axially fixed and/or rotationally fixed manner, for example, by means of an interference fit.

Figure 6A:
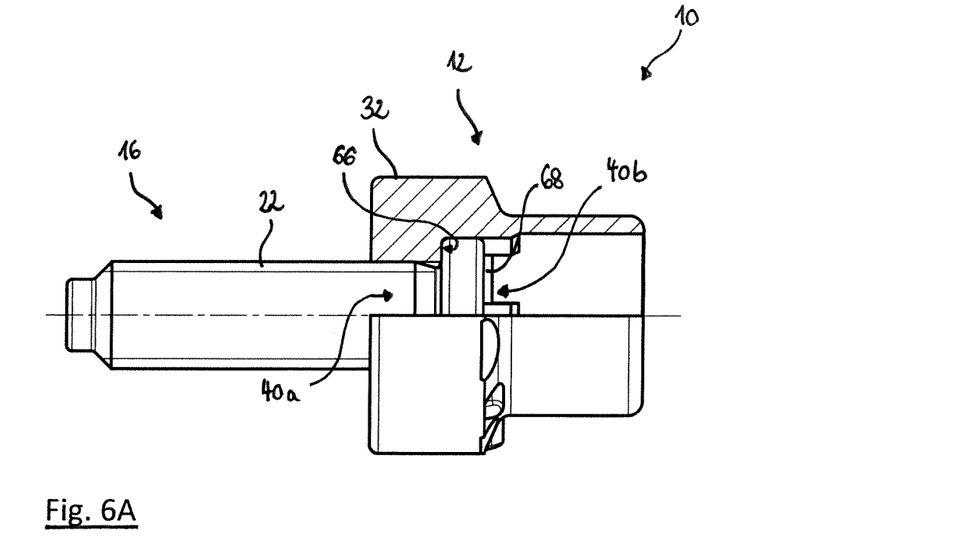
FIG. 6A a side and cross-sectional view of a functional element in accordance with a third embodiment.
Figure 6B:
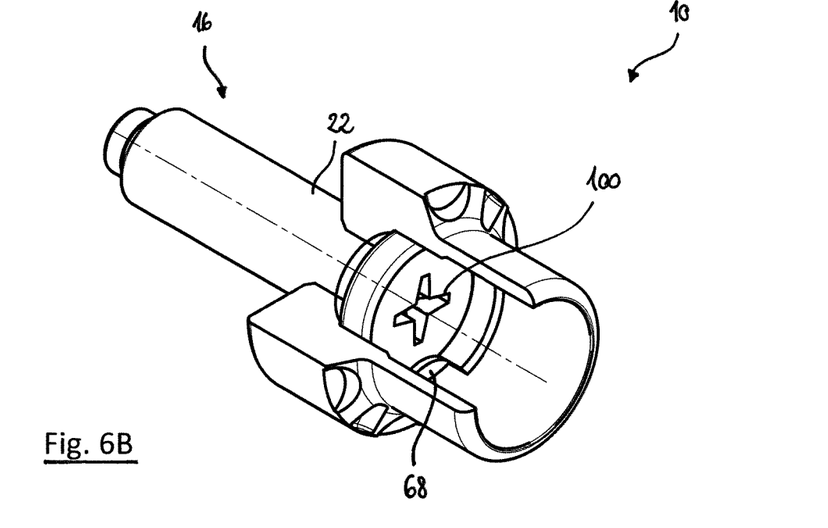
FIG. 6B a perspective view of the functional element of FIG. 6A.

FIGS. 6A, 6B show a functional element 10 in accordance with a third embodiment that has a bolt element 16 that is already provided with an external thread 22 before the insertion into the fastening section 12. The external thread 22 extends almost over the total shaft part 18 and in particular up to the radially expanded end section 19. The bolt element 16 is provided to be screwed into the fastening section 12 by means of a screwing tool. As a drive profile for the screwing tool, a cross recess 100 is arranged at an end face of the radially expanded end section 19. The head part 32 can have a corresponding complementary thread in the first section 40a. Alternatively, the bolt element 16 can also be screwed into a smooth inner wall of the passage opening 40 while scraping off material. This is in particular suitable if the material of the functional element 14 is harder than the material of the fastening section 12.

A relative rotation of the fastening element 12 and the functional element 14 in the radial direction is prevented in the screw-in direction in that the shoulder 66 blocks a further axial—and thus radial—movement of the functional element 14. To block the radial—and also axial—movement of the functional element 14 in the unscrewing direction, a form fit of the radially expanded end section 19 acting in the axial direction is provided with a securing section that extends in the radial direction and that is formed as an undercut 68. The undercut 68 can be produced in a subsequent securing step by scraping off material from an inner wall of the second section of the passage opening 40b and/or of the hollow space 42.

Figure 7A:
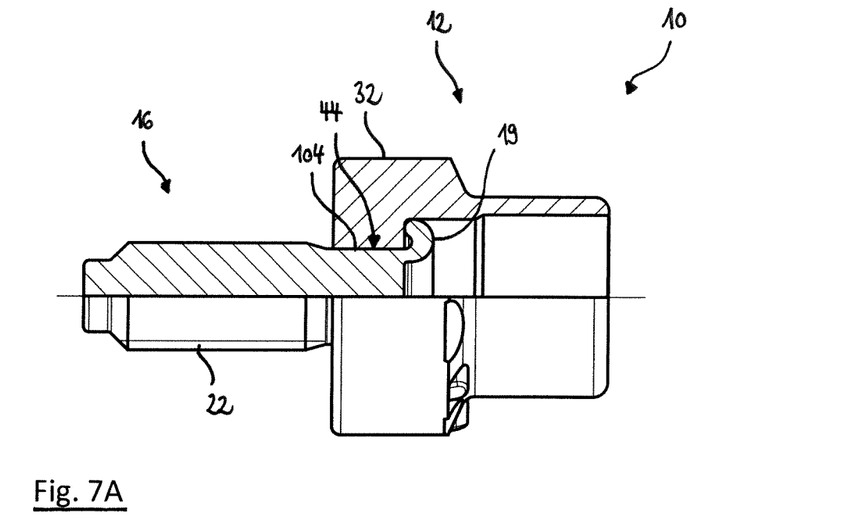
FIG. 7A a side and cross-sectional view of a functional element in accordance with a fourth embodiment.
Figure 7B:
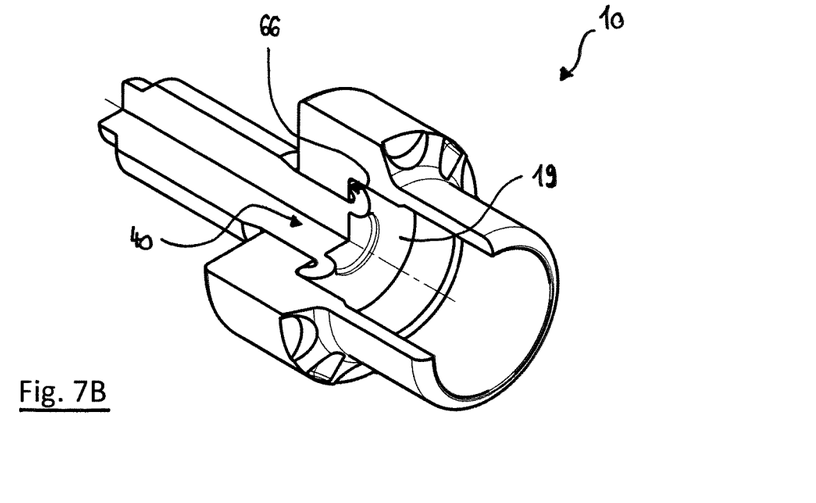
FIG. 7B a perspective view of the functional element of FIG. 7A.

FIGS. 7A, 7B show a functional element 10 in accordance with a fourth embodiment in which the bolt element 16 is fastened in the head part 32 of the fastening section 12 by a riveting process. A security against rotation selectively takes place by a knurling, ribs, or other features providing security against rotation of the bolt element 16 in a first coupling region 44 that can be arranged at the end section 19 radially expanded by reshaping and/or at a section 104 of the shaft part 18 that is in engagement with the head part 32, in particular with an inner wall of the passage opening 40 of the head part 32.

A securing in the axial direction takes place, on the one hand, by the shoulder 66 of the passage opening 40 that cooperates with the radially expanded end section 19. In addition, further form-fit contributions and/or force-fit contributions can result from the rivet connection between the fastening section 12 and the functional section 14, for example through an engagement behind or a pressing, and block a relative movement between the fastening section 12 and the functional section 14 in one or both axial directions and/or in the radial direction.

REFERENCE NUMERAL LIST 10 functional element
12 fastening section
14 functional section
16 bolt section
18 shaft part
19 radially expanded end section
20 functional region
22 external thread
26 reshaping section
28 rivet section
30 punching edge
32 head part
34 head part support surface
36 feature providing security against rotation
36a recess
36b elevated portion
38 axial opening of the fastening section 12
40 passage opening
40a first section of the axial passage opening 40
40b second section of the axial passage opening 40
42 hollow space
44 first coupling section
46 second coupling section
48 knurling of the first coupling section 44
52 knurling of the second coupling section 46
56 third coupling connection
58 fourth coupling section
64 radially extending surface 64 of the radially expanded end section 19
66 shoulder
68 undercut
70 fixing element
72 functional unit
74 fixing nut
76 internal thread
78 fixing element contact surface
80 head part contact surface
82 drive profile
84 engagement section
86 setting section
88 annular setting surface
90 component assembly
92 hole
94 punched slug
95 undercut of the rivet section 28
96 dome-like deformation
98 contact line
100 cross recess
L longitudinal axis

The invention claimed is:

1. A functional element for attachment to a workpiece, said functional element comprising:
a fastening section that has a reshaping section that can be reshaped to fasten the functional element to the workpiece, and
a functional section having a functional region, wherein the functional section is connected to the fastening section,
wherein the functional section and the fastening section are fixedly connected to stop relative rotation between them.

2. The functional element in accordance with claim 1, wherein the reshaping section is a rivet section.

3. The functional element in accordance with claim 1, wherein the fastening section has a self-punching design.

4. The functional element in accordance with claim 1, wherein the fastening section and the functional section are each produced from a metallic material.

5. The functional element in accordance with claim 1, wherein the fastening section has a head part adjoining the reshaping section in an axial direction.

6. The functional element in accordance with claim 5, wherein the head part has a head part support surface extending in a radial direction and facing the reshaping section.

7. The functional element in accordance with claim 1, wherein the functional section has a first coupling section for establishing a rotationally fixed coupling with a second coupling section that is formed at the fastening section.

8. The functional element in accordance with claim 7, wherein the first and the second coupling section have corresponding coupling features that are in engagement with one another so that a form fit effective in a peripheral direction is provided.

9. The functional element in accordance with claim 7, wherein the first and the second coupling section are connected to one another in a form-fitted and/or force-fitted manner.

10. The functional element in accordance with claim 1, wherein the functional section has a third coupling section for establishing a coupling effective at least in an axial direction with a fourth coupling section that is formed at the fastening section.

11. The functional element in accordance with claim 10, wherein the third and the fourth coupling section have corresponding coupling features that are in engagement with one another so that a form fit effective at least in an axial direction is provided.

12. The functional element in accordance with claim 1, wherein the reshaping section bounds at least an axial section of a hollow space of the fastening section in the peripheral direction, wherein the hollow space is open at a side facing away from the head part.

13. The functional element in accordance with claim 12, wherein the head part has an axial passage opening that is in communication with the hollow space.

14. The functional element in accordance with claim 13, wherein the passage opening and the hollow space are coaxially arranged.

15. The functional element in accordance with claim 13, wherein at least one portion of the functional section projects into or through the passage opening.

16. The functional element in accordance with claim 13, wherein the passage opening and/or the hollow space has/have an abutment or a radial shoulder, or wherein the passage opening has a smaller inner diameter than the hollow space so that an abutment or a radial shoulder is formed.

17. The functional element in accordance with claim 1, wherein the functional section has a radially expanded end section that cooperates with an abutment or a shoulder.

18. The functional element in accordance with claim 1, wherein a section of the inner wall of the hollow space and/or a section of the passage opening is/are reshaped to produce a radially inwardly projecting undercut.

19. The functional element in accordance with claim 18, wherein the reshaping is carried out by a scraping process.

20. A functional unit comprising a functional element of claim 1 and a fixing element that is fixable to a functional region of the functional element, said functional element comprising
    a fastening section that has a reshaping section that can be reshaped to fasten the functional element to the workpiece, and
    a functional section having a functional region, wherein the functional section is connected to the fastening section,
    wherein the fastening section and the functional section are produced from different materials.

21. The functional unit in accordance with claim 20, wherein the fixing element has an engagement section for a tool for fastening the fixing element to the functional region and/or a setting section, said setting section being suitable for engaging at a setting device in order to fasten the functional unit to the workpiece.

22. A component assembly comprising one of a functional element and a functional unit comprising a functional element in accordance with claim 1 and a fixing element that is fixable to a functional region of the functional element in accordance with claim 1 and a workpiece, said functional element comprising
    a fastening section in accordance with claim 1 that has a reshaping section that can be reshaped to fasten the functional element to the workpiece, and
    a functional section in accordance with claim 1 having a functional region, wherein the functional section in accordance with claim 1 is connected to the fastening section in accordance with claim 1,
    wherein the fastening section and the functional section are produced from different materials, wherein the fastening section of the functional element is attached in a form-fitted manner to the workpiece in a fastening region of the workpiece by a reshaping process.

23. The component assembly in accordance with claim 22, wherein the reshaping section of the fastening section and the fastening region of the workpiece are produced from the same material.

24. A method of manufacturing a component assembly in accordance with claim 22, comprising the steps:
    providing a functional element in accordance with claim 1 or a functional unit comprising the functional element in accordance with claim 1 and a fixing element;
    inserting the fastening section into a prefabricated hole in the workpiece or inserting the fastening section into the workpiece in a self-punching manner; and
    reshaping the reshaping section to produce an undercut engaging behind the workpiece in order to fasten the functional element or the functional unit to the workpiece.

25. The method in accordance with claim 24, wherein a setting device is provided that cooperates with the fastening section, or with the fixing element in order to press the functional element or the functional unit against the workpiece.

* * * * *